United States Patent
Poehner

(10) Patent No.: US 11,420,548 B2
(45) Date of Patent: Aug. 23, 2022

(54) TARP SECURING APPARATUS

(71) Applicant: Marc Poehner, St Louis, MO (US)

(72) Inventor: Marc Poehner, St Louis, MO (US)

( * ) Notice: Subject to any disclaimer, the term of this patent is extended or adjusted under 35 U.S.C. 154(b) by 83 days.

(21) Appl. No.: 16/897,413

(22) Filed: Jun. 10, 2020

(65) Prior Publication Data
US 2020/0384907 A1 Dec. 10, 2020

Related U.S. Application Data

(63) Continuation-in-part of application No. 16/435,467, filed on Jun. 8, 2019, now Pat. No. 10,773,578.

(51) Int. Cl.
*B60P 7/08* (2006.01)
*B60P 7/04* (2006.01)
*F16B 5/06* (2006.01)

(52) U.S. Cl.
CPC ............ *B60P 7/0807* (2013.01); *B60P 7/04* (2013.01); *F16B 5/0692* (2013.01)

(58) Field of Classification Search
CPC ........ B60P 7/0807; B60P 7/04; F16B 5/0692; F16B 45/00; F16B 45/02; B65D 33/1666; Y10T 24/44043; Y10T 24/4406; Y10T 24/15; E04H 15/642
See application file for complete search history.

(56) References Cited

U.S. PATENT DOCUMENTS

| | | | | |
|---|---|---|---|---|
| 4,103,401 A | * | 8/1978 | Conley | F16B 5/0692 24/462 |
| 4,107,826 A | * | 8/1978 | Tysdal | F16B 5/0692 160/395 |
| 4,694,543 A | * | 9/1987 | Conley | F16B 5/0692 160/395 |
| 4,847,958 A | * | 7/1989 | Conley | F16B 5/0692 24/461 |
| 5,203,055 A | * | 4/1993 | Broadwater, Sr. | B60J 7/104 135/119 |
| 5,613,282 A | * | 3/1997 | Deddens, Sr. | B65D 33/1666 24/30.5 R |
| 6,148,488 A | * | 11/2000 | Gristock | E04H 15/646 160/392 |
| 6,292,987 B1 | * | 9/2001 | Combes | B60J 7/104 24/460 |
| 7,608,782 B2 | * | 10/2009 | Hill | H01R 4/646 174/84 C |
| 10,279,665 B2 | * | 5/2019 | Poehner | B60J 7/068 |

(Continued)

*Primary Examiner* — Robert Sandy
*Assistant Examiner* — Rowland Do
(74) *Attorney, Agent, or Firm* — Gulf Coast Intellectual Property Group

(57) ABSTRACT

A tarp securing apparatus that is configured to secure a tarp to an object from both sides of the tarp. The tarp securing apparatus includes a first portion and a second portion wherein the first portion and second portion are formed in a shape so as to be mateably coupled. The first portion is located on the first side of the tarp and the second portion is located on the second side of the tarp. A portion of the tarp is biased in between the first portion and the second portion so as to secure the portion of the tarp. Apertures are provided to operably couple with an anchoring fastener or other securing element. The tarp securing apparatus is manufactured from a lightweight rigid material and is configured to be placed in various positions on a tarp.

3 Claims, 3 Drawing Sheets

(56) References Cited

U.S. PATENT DOCUMENTS

| | | | | |
|---|---|---|---|---|
| 2006/0219373 A1* | 10/2006 | McKinney | ............ | E04H 15/642 |
| | | | | 160/395 |
| 2009/0211059 A1* | 8/2009 | Byron | ................ | B65D 33/1666 |
| | | | | 24/30.5 R |
| 2011/0044753 A1* | 2/2011 | Kotaki | ................. | B60N 2/7094 |
| | | | | 403/235 |
| 2011/0094164 A1* | 4/2011 | Seeger | ................. | E04H 15/642 |
| | | | | 52/2.14 |
| 2012/0023709 A1* | 2/2012 | Hsu | ................... | B65D 33/1666 |
| | | | | 24/30.5 R |
| 2016/0353868 A1* | 12/2016 | Steigerwald | ....... | B65D 33/1666 |
| 2017/0037885 A1* | 2/2017 | Smullen | ................. | D06F 55/00 |

\* cited by examiner

TARP SECURING APPARATUS

FIELD OF THE INVENTION

The present invention relates generally to tie down mechanisms, more specifically but not by way of limitation, tie down and securing apparatus for covers such as but not limited to tarp and similar material covers wherein the present invention provides securing thereof while inhibiting damage to the tarp or similar material and further provides alternate securing locations and benefits.

BACKGROUND

As is known in the art, tarps and similar materials are commonly used to cover various objects. These objects can include but are not limited to various types of recreational equipment, tools or numerous other objects. Tarps are commonly used to cover the aforementioned objects when the objects are either stored or in transport on trailer. Conventional tarps are manufactured from plastic or canvas and are commercially available in various sizes. These tarps are provided with integral grommets that are placed along the perimeter edge of the tarps. As is known in the art, conventional grommets are typically metal rings that have been secured within the tarp and provide a location for securing the tarp to a desired anchor utilizing rope or other suitable element.

One issue with securing conventional tarps is the stress placed on the area of the tarp adjacent the grommet. Often when a tarp has been used to cover an object on a trailer, the forces of the wind will cause premature failure of the tarp grommet. Once the grommet area of the tarp is damaged, this can result in various undesirable effects such as damage to the object being covered. Additionally, as tarps are provided in generic sizes, they typically can not be secured around an object so as to reduce the air volume and/or space between the object and the tarp. This results in the inability to tightly secure a tarp around an object and when subjected to wind or other forces grommet failure will typically occur.

Accordingly, there is a need for a tarp securing apparatus that provides securing of a tarp to or around an object wherein the tarp securing apparatus does not utilize the grommets of a tarp but provides variable securing location without penetration of the tarp material.

SUMMARY OF THE INVENTION

It is the object of the present invention to provide a tarp securing apparatus that is configured to secure a tarp without penetrating the tarp material wherein the present invention includes a first embodiment that includes a first portion and a second portion configured to bias a portion of the tarp therebetween.

Another object of the present invention is to provide a tarp tie down configured to provide securing of a tarp to an object without the use of grommets wherein the first portion of the first embodiment of the present invention is located adjacent to the inner surface of the present invention.

A further object of the present invention is to provide a tarp securing apparatus that is configured to secure a tarp without penetrating the tarp material wherein the second portion of the first embodiment is located adjacent to the exterior surface of the tarp.

Still another object of the present invention is to provide a tarp tie down configured to provide securing of a tarp to an object without the use of grommets wherein the first portion and second portion include apertures configured to receive fasteners and or other securing elements therein.

An additional object of the present invention is to provide a tarp securing apparatus that is configured to secure a tarp without penetrating the tarp material wherein the first portion and second portion of the first embodiment include sections that are formed to be mateably coupled.

Yet a further object of the present invention is to provide a tarp tie down configured to provide securing of a tarp to an object without the use of grommets that includes a second embodiment wherein the second embodiment is configurable to facilitate a tarp to tarp coupling or the securement of a tarp to an object.

Another object of the present invention is to a provide a tarp securing apparatus that is configured to secure a tarp without penetrating the tarp material wherein the second embodiment includes a base member that can be placed in either a fixed or temporary location.

An alternate object of the present invention is to provide a tarp tie down configured to provide securing of a tarp to an object without the use of grommets wherein the second embodiment includes a sealing tube member configured to operably couple with the base member.

Still a further object of the present invention is to provide a tarp securing apparatus that is configured to secure a tarp without penetrating the tarp material wherein the second embodiment includes a locking tube that is configured to be journaled into the sealing tube member.

An additional object of the present invention is to provide a tarp tie down configured to provide securing of a tarp to an object without the use of grommets wherein the locking tube member of the second embodiment of the present invention is configured to receive an article therethrough such as but not limited to a cable lock.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
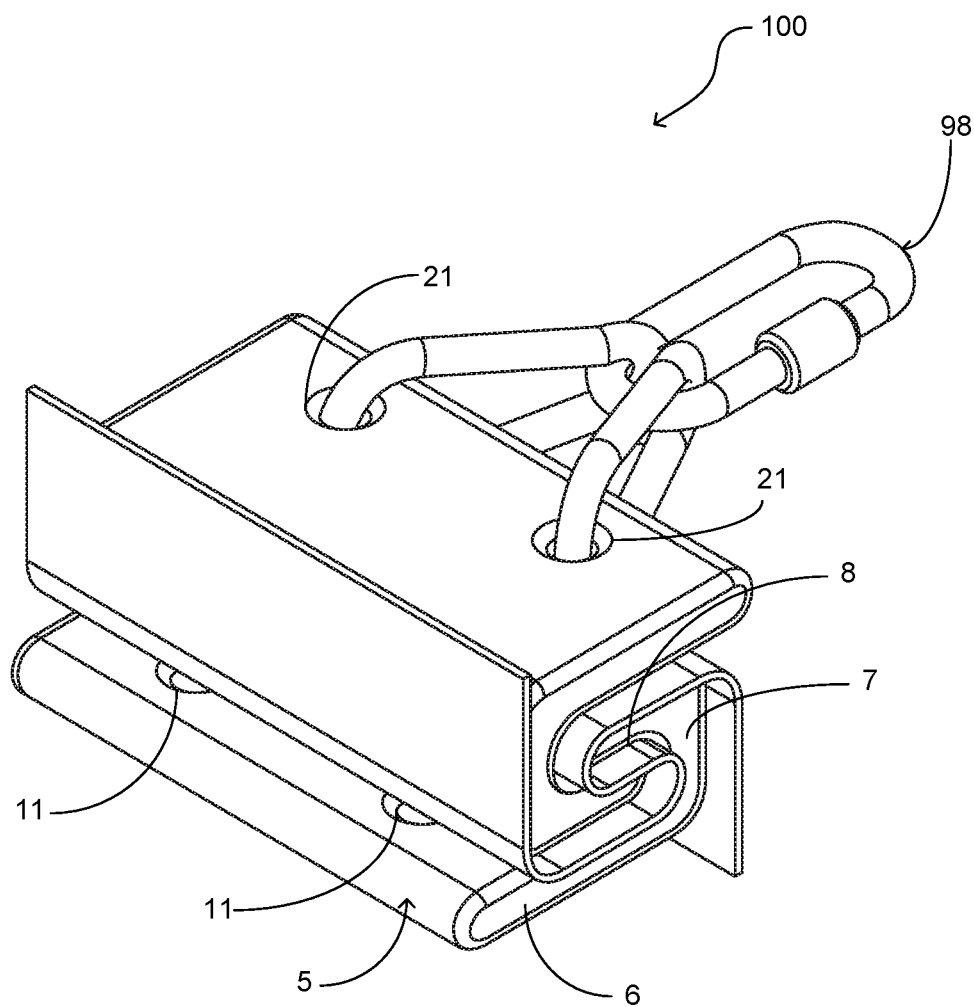
FIG. 1 is a side perspective view of a first embodiment of the present invention.

Referring now to the drawings submitted herewith, wherein various elements depicted therein are not necessarily drawn to scale and wherein through the views and figures like elements are referenced with identical reference numerals, there is illustrated a tarp securing apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
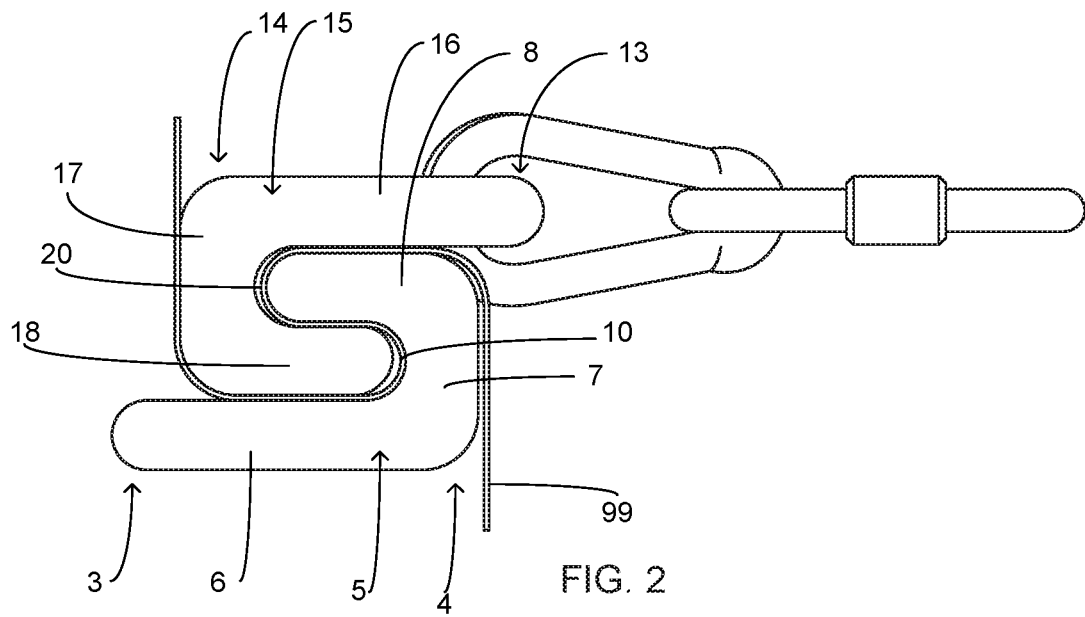
FIG. 2 is a side view of the first embodiment.

Now referring in particular to the FIGS. 1 and 2 submitted herewith, the first embodiment of the tarp securing apparatus 100 is illustrated therein. The tarp securing apparatus 100 includes a first portion 5 and a second portion 15 that are configured to bias a portion of an exemplary tarp 99 therebetween so as to facilitate the securing of the tarp to an object inside/underneath the tarp and/or secure the tarp to a fixed anchor point. It should be understood within the scope of the present invention that the exemplary tarp 99 is utilized for discussion purposes and that the embodiments of the tarp securing apparatus 100 discussed herein could be utilized to secure any flat flexible material in the manner illustrated and discussed herein for the exemplary tarp 99.

The first portion 5 includes a first section 6, second section 7 and third section 8. The first section 6, second section 7 and third section 8 are contiguously formed utilizing suitable techniques and are manufactured from a durable rigid material such as but not limited to plastic. The first section 6 is planar in manner having a first end 3 and second end 4. Contiguous with the second end 4 of the first section 6 is the second section 7, which is perpendicular with respect to the first section 6. The second section 7 extends away from the first section 6 and is contiguous with the third section 8 distal to the first section 6. The third section 8 is perpendicular to the second section 7 and extends away therefrom. The third section 8 is parallel with the first section 6 so as to create a void 10 therebetween. The void 10 as will be further discussed herein is operable to receive the third section 18 of the second portion 15. Additionally, as illustrated herein in FIG. 2, the void 10 further has disposed therein a portion of the exemplary tarp 99.

The first section 6 of the first portion 5 further includes apertures 11 formed therein. The apertures 11 are configured to be operably coupled with exemplary fasteners 98 or other securing elements such as but not limited to rope. While the first section 6 of the first portion 5 has illustrated herein two apertures 11, it is contemplated within the scope of the present invention that the first section 6 could be configured with as few as one aperture 11 or more than two apertures 11. Furthermore, it should be understood within the scope of the present invention that both the first portion 5 and second portion 15 could be manufactured in alternate widths in order to provide various load distributions.

The second portion 15 is identically formed as the first portion 5. The second portion 15 includes a first section 16, second section 17 and third section 18. The first section 16 is planar in manner having a first end 13 and second end 14. Contiguous with the second end 14 of the first section 16 is the second section 17, which is perpendicular with respect to the first section 16. The second section 17 extends away from the first section 16 and is contiguous with the third section 8 distal to the first section 16. The third section 18 is perpendicular to the second section 17 and extends away therefrom. The third section 18 is parallel with the first section 16 so as to create a void 20 therebetween. The void 10 of the first portion and the void 20 of the second portion 15 are sized so as to accommodate therein the third section 18 and third section 8 respectively. The third sections 8,18 are manufactured having a length that is less than that of the first sections 6, 16 respectively. The longer length of the first sections 6, 16 and the voids 10,20 facilitate the mateable engagement of the first portion 5 and second portion 15 as illustrated in FIGS. 1 and 2 herein. Prior to being operably coupled, the first portion 5 and second portion 15 are positioned on adjacent sides of the exemplary tarp 99 and a portion thereof is placed therebetween. Fasteners 98 or other suitable elements are secured to the apertures 11 and 21 whereupon an opposing directional force is applied thereto. The portion of the exemplary tarp 99 is biased intermediate the first portion 5 and second portion 15 ensuing the opposing directional force. The advantage of the present invention is demonstrated here as no grommet or penetration of the exemplary tarp 99 occurs. The width of the first portion 5 and second portion 15 combined with no compromise of the exemplary tarp 99 allows for greater force to be applied to improve the securing of the exemplary tarp 99 to an object and/or anchor point. Furthermore, the tarp securing apparatus 100 can be placed in numerous locations on the exemplary tarp 99 which provides the ability to more securely fasten the exemplary tarp 99 reducing interior volume and potential to be disrupted by wind and the like.

While the tarp securing apparatus 100 is illustrated herein having a first portion 5 and second portion 15 with a particular shape, it is contemplated within the scope of the present invention that the tarp securing apparatus 100 could be formed in alternate shapes having mateable portions as described herein wherein the mateable portions provide the desired functionality of operably coupling and biasing a portion of a tarp therebetween.

Now referring to FIG. 3 through FIG. 6 submitted herewith, an alternative embodiment of the tarp securing apparatus 200 is illustrated therein. The tarp securing apparatus 200 includes a base member 210 wherein the base member is manufactured from a material such as but not limited to plastic. The base member 210 includes a bottom portion 215 having a flat lower surface 216. The bottom portion 215 has extending upward therefrom a receiving member 220. The receiving member 220 is semicircular in shape and includes a first section 222 and a second section 224 wherein the first section 222 and second section 224 are arcuate in form and have a void 225 therebetween. The base member 210 includes a first end 208 and second end 209 and it is contemplated within the scope of the present invention that the length therebetween could vary in order to manufacture a base member 210 of alternate sizes. The bottom portion 215 includes tab member 213 wherein tab member 213 extends outward beyond first section 222. Tab member 213 has a plurality of apertures 230 formed therein wherein the apertures 230 are operable to receive a fastener or securing element therein. It should be understood within the scope of the present invention that the tab member 213 could have as few as one aperture 230 or more than three.

Figure 3:
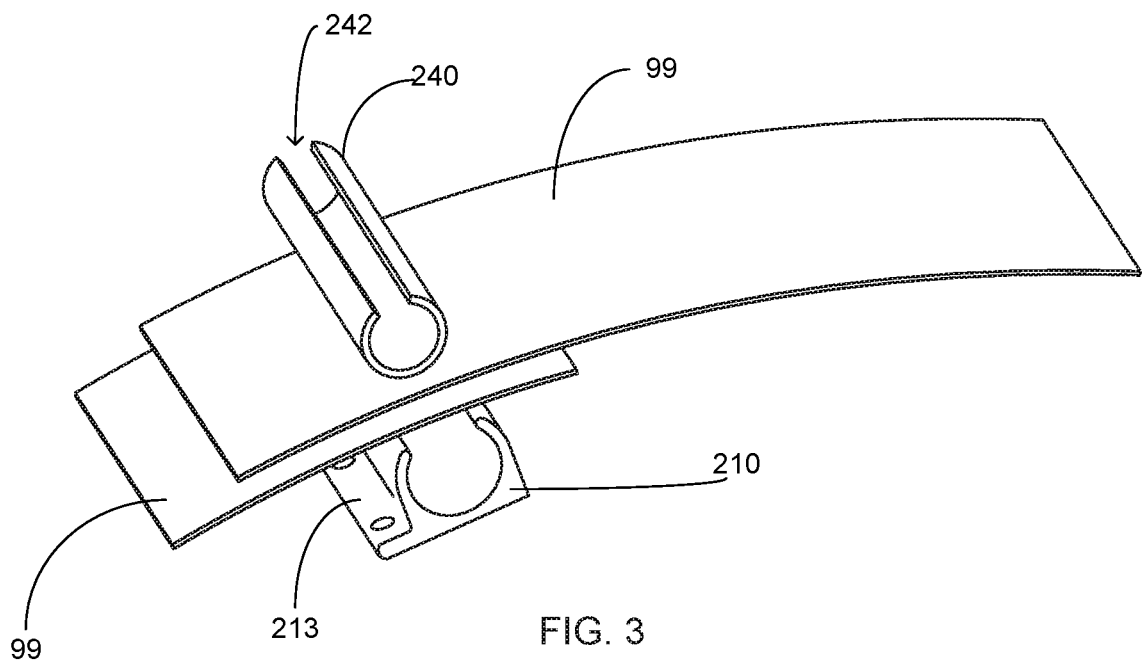
FIG. 3 is a perspective view of a portion of an alternative embodiment of the present invention.
Figure 4:
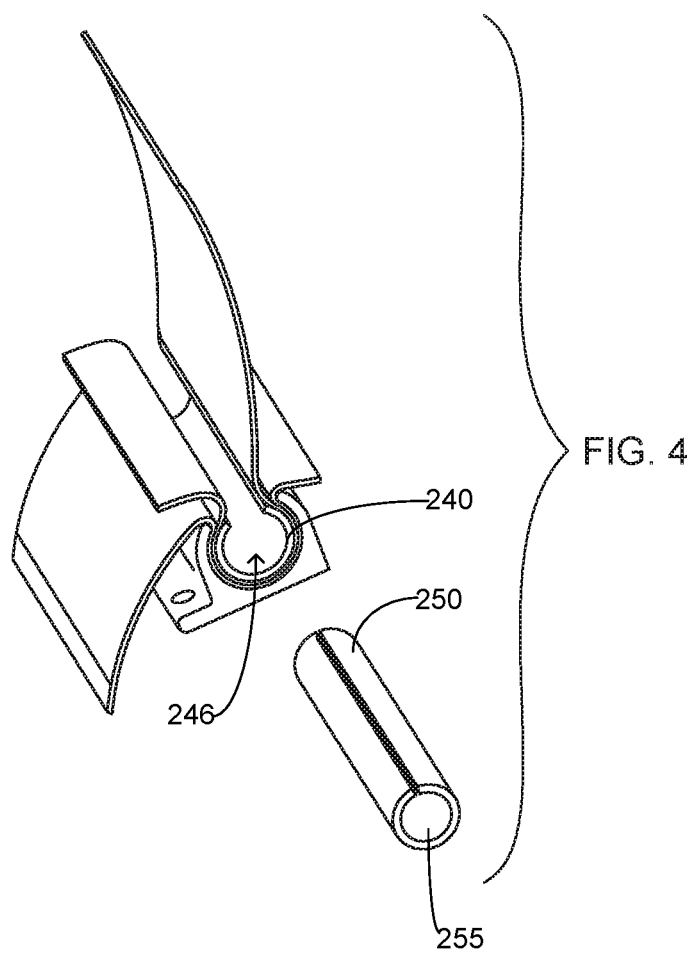
FIG. 4 is a side perspective view of the alternative embodiment of the present invention.
Figure 5:
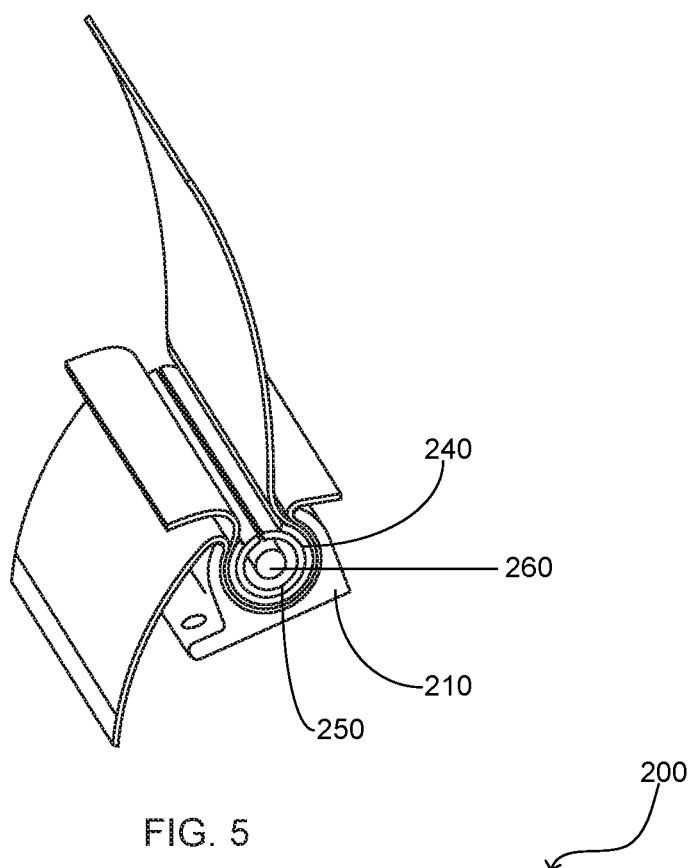
FIG. 5 is an assembled view of the alternative embodiment of the present invention.
Figure 6:
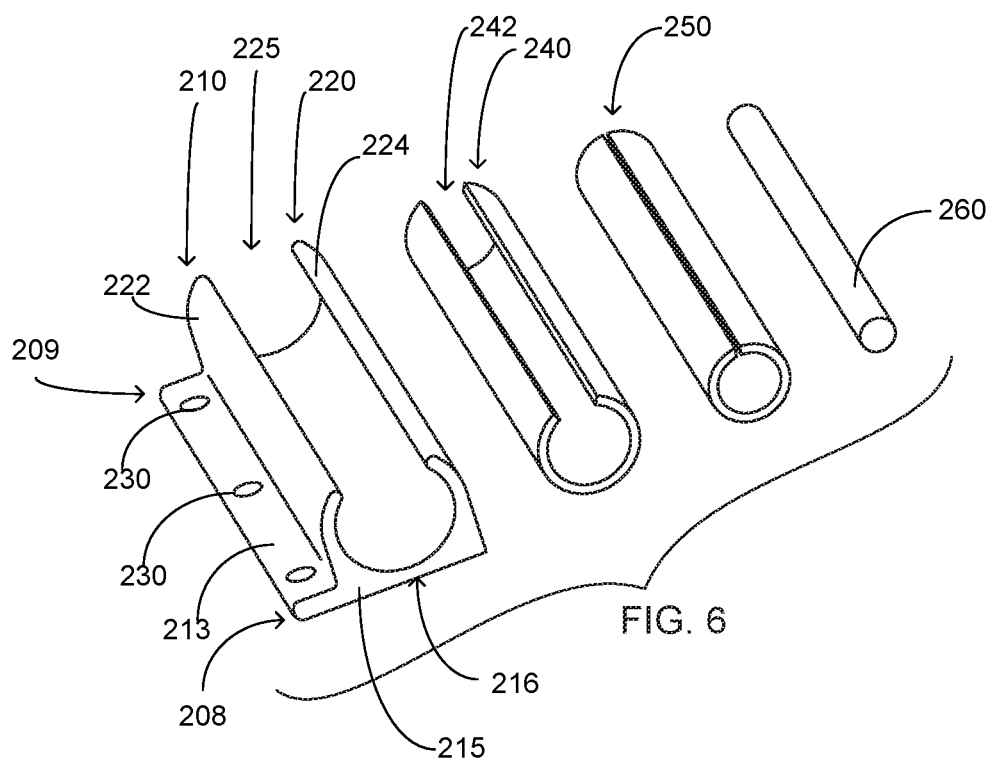
FIG. 6 is a detailed view of the components of the alternative embodiment of the present invention.

The tarp securing apparatus 200 further includes a sealing tube member 240. The sealing tube member 240 is configured to be operably coupled with the base member 210. In particular the sealing tube member 240 is mateably shaped so as to be inserted into the void 225 and bias against the first section 222 and second section 224. The sealing tube member 240 is shaped in a semicircular form and manufactured from a resilient material. The slot 242 at the top of the sealing tube member 240 allows for compression of the sealing tube member 240 so as to be inserted into the void 225 and bias against the first section 222 and second section 224 of the base member 210. FIGS. 3 and 4 illustrated the positioning of an exemplary tarp 99 wherein the exemplary tarp 99 is positioned intermediate the base member 210 and sealing tube member 240 prior to insertion of the sealing tube member 240. The exemplary tarp 99 is biased against the first section 222 and second section 224 by the sealing tube member 240. Ensuing release of the compression on the sealing tube member 240 subsequent insertion into the void 225, the exemplary tarp 99 is locked into position therein. It should be understood that the tarp securing apparatus 200 could be utilized to secure two adjacent tarps together (as illustrated herein in FIGS. 3-5) or be utilized to secure a tarp 99 to an object and/or anchor point.

The tarp securing apparatus 200 further includes a locking tube member 250. The locking tube member 250 is manufactured from a durable material such as but not limited to plastic and is configured to be inserted into the hollow passage 246 of the sealing tube member 240 ensuring engagement of the sealing tube member 240 with the base member 210. The locking tube member 250 is tubular in shape having a diameter suitable to facilitate the insertion thereof into hollow passage 246. The locking tube member 250 prevents the sealing tube member 240 from dislodging from the base member 210 as the locking tube member 250 inhibits the ability for the sealing tube member 240 to be compressed. The locking tube member 250 includes a hollow passage 255 therethrough but it is contemplated within the scope of the present invention that the locking tube member 250 could be solid construction.

The tarp securing apparatus 200 can further include accessory element 260. The accessory element 260 is sized so as to be journaled through the passage 255 of the locking tube member 250. The accessory element 260 is optional and it is contemplated to be a variety of elements within the scope of the present invention. By way of example but not limitation, the accessory element 260 could be a cable having lockable ends, a power cord, control wiring or a supply tube. The locking tube member 250 is designed with the passage 255 in order to accommodate various applications wherein it may be desirable to employ an accessory element 260 as described herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A tarp securing apparatus configured to provide securing of a tarp to an object comprising:
    a base member, said base member having a bottom portion, said bottom portion being planar in manner, said bottom portion having a lower surface and an upper surface, said base member having integrally formed on the upper surface thereof a receiving member, said receiving member extending upward from said upper surface of said bottom portion, said receiving member having a first section and a second section, wherein said first section and said second section of said receiving member being arcuate in shape, said first section and said second section having an upper edge, and said receiving member having a void intermediate said first section and said second section;
    a sealing tube member, said sealing tube member being mateably shaped with said void of said receiving member, said sealing tube member having a first end and a second end, said sealing tube member configured to be inserted into said void of said base member, said sealing tube member being shaped in a semicircular form, said sealing tube member being manufactured from a resilient material, said sealing tube member having a slot extending from said first end of said sealing tube member to said second end of said sealing tube member, said slot configured to facilitate compression of said sealing tube member so as to place within said void of said base member, said sealing tube member having a hollow passage extending therethrough ensuing placement into said void of said base member;
    a locking tube member, said locking tube member having a first end and a second end, said locking tube member being formed to be mateably shaped with the hollow passage of the sealing tube member, said locking tube member having a hollow passage between said first end and said second end of said locking tube member;
    an accessory element, said accessory element being rod shaped so as to be journaled into the hollow passage of the locking tube member; and
    wherein a portion of the tarp is placed intermediate said sealing tube member and said receiving member so as to bias therebetween.

2. The tarp securing apparatus as recited in claim 1, wherein said base member further includes a tab member, said tab member being contiguous with said bottom portion, said tab member extending beyond said first section of said receiving member.

3. The tarp securing apparatus as recited in claim 2, wherein said tab member further includes at least one aperture, said at least one aperture configured to be operably coupled with an anchoring element.

* * * * *